US010379934B2

(12) United States Patent
Vedurumudi et al.

(10) Patent No.: US 10,379,934 B2
(45) Date of Patent: Aug. 13, 2019

(54) SYSTEM AND METHOD OF PROVIDING POST ERROR ANALYSIS FOR INSTANCES OF APPLICATIONS IN CLOUD SERVICE ENVIRONMENTS ON A PER USER BASIS

(71) Applicant: Oracle International Corporation, Redwood Shores, CA (US)

(72) Inventors: Prasad V V Vedurumudi, Bangalore (IN); Praveen Morusupalli, Frisco, TX (US)

(73) Assignee: Oracle International Corporation, Redwood Shores, CA (US)

(*) Notice: Subject to any disclaimer, the term of this patent is extended or adjusted under 35 U.S.C. 154(b) by 186 days.

(21) Appl. No.: 15/664,956

(22) Filed: Jul. 31, 2017

(65) Prior Publication Data
US 2019/0034253 A1   Jan. 31, 2019

(51) Int. Cl.
G06F 11/00 (2006.01)
G06F 11/07 (2006.01)

(52) U.S. Cl.
CPC ........ G06F 11/079 (2013.01); G06F 11/0709 (2013.01); G06F 11/0775 (2013.01); G06F 11/0784 (2013.01)

(58) Field of Classification Search
CPC ............. G06F 11/3476; G06F 11/0706; G06F 2201/86; G06F 11/0781; G06F 11/3003; H04L 43/04; H04L 43/06
See application file for complete search history.

(56) References Cited

U.S. PATENT DOCUMENTS

| 8,255,902 | B1* | 8/2012 | Satish | G06F 11/008 |
| | | | | 713/189 |
| 8,656,226 | B1* | 2/2014 | Havemose | G06F 11/0715 |
| | | | | 714/47.3 |
| 9,652,316 | B2* | 5/2017 | Gamage | G06F 11/079 |
| 10,061,680 | B2* | 8/2018 | Vlachogiannis | G06F 9/542 |
| 10,110,419 | B2* | 10/2018 | Whitner | H04L 41/0631 |
| 10,185,613 | B2* | 1/2019 | Movsisyan | G06F 11/0709 |
| 10,223,367 | B2* | 3/2019 | Pradeep | G06F 16/182 |

(Continued)

OTHER PUBLICATIONS

Barbara Russo et al.; "Mining System Logs to Learn Error Predictors: A Case Study of a Telemetry System"; 30 pages.
(Continued)

Primary Examiner — Loan L. T. Truong
(74) Attorney, Agent, or Firm — Trellis IP Law Group, PC

(57) ABSTRACT

Instances of the applications executing in the cloud service environments that users interact with. Each of the cloud service environments includes a respective set of instances of the applications. Each of the cloud service environments and the respective set of instances is associated with a different one of the users. Errors are detected during the execution of the instances of the applications. Sets of log file information describing the errors are created. Each of the sets of log file information describes one of the errors. Log files are created. Each of the log files include one of the sets of log file information and an identification of a cloud service environment where an associated error occurred. The log files are categorized based on identifications of the cloud service environments. A post error analysis report including information from the categorized log files is provided for a particular cloud service environment.

20 Claims, 11 Drawing Sheets

(56) References Cited

U.S. PATENT DOCUMENTS

| | | | |
|---|---|---|---|
| 2002/0032763 A1* | 3/2002 | Cox | H04L 67/1095 709/223 |
| 2005/0144526 A1* | 6/2005 | Banko | G06F 11/079 714/38.12 |
| 2006/0070037 A1* | 3/2006 | Canning | G06F 11/34 717/127 |
| 2012/0005542 A1* | 1/2012 | Petersen | G06F 11/0709 714/48 |
| 2012/0166869 A1* | 6/2012 | Young | G06F 11/008 714/15 |
| 2013/0219050 A1* | 8/2013 | Park | H04L 67/06 709/224 |
| 2014/0149576 A1* | 5/2014 | Pavlov | G06F 11/302 709/224 |
| 2014/0229606 A1* | 8/2014 | Griswold | H04L 41/069 709/224 |
| 2015/0081918 A1* | 3/2015 | Nowack | H04L 29/06 709/227 |
| 2015/0227598 A1* | 8/2015 | Hahn | G06F 16/122 707/722 |
| 2016/0259677 A1* | 9/2016 | Della Corte | G06F 11/079 |
| 2017/0054610 A1* | 2/2017 | Vangala | G06F 11/079 |
| 2017/0099191 A1* | 4/2017 | Stella | H04L 41/145 |
| 2017/0102989 A1* | 4/2017 | Kotikalapudi | G06F 11/0793 |
| 2017/0279928 A1* | 9/2017 | Mokeev | G06F 9/541 |
| 2018/0285234 A1* | 10/2018 | Degaonkar | G06F 11/3476 |
| 2018/0287856 A1* | 10/2018 | Whitner | H04L 67/10 |
| 2019/0005018 A1* | 1/2019 | Sharma | G06F 17/2785 |
| 2019/0081871 A1* | 3/2019 | Nazar | H04L 43/04 |
| 2019/0097969 A1* | 3/2019 | Voss | H04L 67/28 |

OTHER PUBLICATIONS

Júlia Murínová; "Application Log Analysis Master's thesis"; Brno, 2015; 127 pages.

* cited by examiner

FIGURE 4

```
┌─────────────────────────────────────────────────────────────────┐
│                          PAGE 400                               │
│  ┌───────────────────────────────────────────────────────────┐  │
│  │                        TABLE 410                          │  │
│  │                                                           │  │
│  │  ┌─────────────────────────────────────────────────────┐  │  │
│  │  │                 ERROR CATEGORY 420                  │  │  │
│  │  │ "Null object found" – EXCEPTION MESSAGE 421         │  │  │
│  │  │ java.lang.NullPointerException – MAIN EXCEPTION OBJECT 422 │
│  │  │ com.example.mypackage1.<myclass1>.<mymethod1>(myclass1.java: line 56)—RE LINE 423 │
│  │  │ Count 3 – COUNT 424                                 │  │  │
│  │  └─────────────────────────────────────────────────────┘  │  │
│  │                                                           │  │
│  │  ┌─────────────────────────────────────────────────────┐  │  │
│  │  │                 ERROR CATEGORY 430                  │  │  │
│  │  │ "Authentication Failed" – EXCEPTION MESSAGE 431     │  │  │
│  │  │ java.lang.AuthenticationFiledException—MAIN EXCEPTION OBJECT 432 │
│  │  │ com.example.mypackage12.<myclass12>.<mymethod12>(myclass12.java: line 13) │
│  │  │ COUNT 1 – COUNT 434                       ╲ RE LINE 433 │
│  │  └─────────────────────────────────────────────────────┘  │  │
│  │                                                           │  │
│  │                                  ┌─────────────────────┐  │  │
│  │                                  │  GET KNOWN ERRORS   │  │  │
│  │                                  │        450          │  │  │
│  │                                  └─────────────────────┘  │  │
│  └───────────────────────────────────────────────────────────┘  │
└─────────────────────────────────────────────────────────────────┘
```

FIGURE 6

EXCEPTION 600

"Null object found" --- EXCEPTION MESSAGE 601 java.lang.NullPointerException---MAIN EXCEPTION OBJECT 602 com.example.mypackage1.<myclass1>.<mymethod1>(myclass1.java: line 56) -- CODE LINE 611
com.example.mypackage2.<myclass2>.<mymethod2>(myclass2.java: line 72) -- CODE LINE 612
com.example.mypackage3.<myclass3>.<mymethod3>(myclass3.java: line 47) -- CODE LINE 613

ERROR TRACE STACK 620

FIGURE 7

ERROR AUGMENTATION INFORMATION 700

701 -- EntryType=ERROR
702 -- Date= date/time when the error occurred
703 -- HostName= hostname of the system where the error originated
704 -- ApplicationName=Name of the Application that generated the error
705 -- CloudServiceEnvironment= The name of the Cloud service environment

FIGURE 8

LOG FILE REPOSITORY 800

LOG FILE 810
811 -- EntryType=ERROR
812 -- Date= 3:00:00am 6/1/2017
813 -- HostName= HOST 1
814 -- ApplicationName=APP 1
815 -- CloudServiceEnvironment= CSE 1
816 -- "Null object found"
817 -- java.lang.NullPointerException
818 -- com.example.mypackage1.<myclass1>.<mymethod1>{myclass1.java: line 56}
819 -- com.example.mypackage2.<myclass2>.<mymethod2>{myclass2.java: line 72}
820 -- com.example.mypackage3.<myclass3>.<mymethod3>{myclass3.java: line 47}

LOG FILE 830
831 -- EntryType=ERROR
832 -- Date= 4:00:00am 6/1/2017
833 -- HostName= HOST 2
834 -- ApplicationName=APP 2
835 -- CloudServiceEnvironment= CSE 1
836 -- "Authentication Failed"
837 -- java.lang.AuthenticationFiledException
838 -- com.example.mypackage11.<myclass11>.<mymethod11>{myclass11.java: line 32}
839 -- com.example.mypackage12.<myclass12>.<mymethod12>{myclass12.java: line 13}
840 -- com.example.mypackage13.<myclass13>.<mymethod13>{myclass13.java: line 25}

LOG FILE 850
851 -- EntryType=ERROR
852 -- Date= 11:00:00am 6/2/2017
853 -- HostName= HOST 1
854 -- ApplicationName=APP 1
855 -- CloudServiceEnvironment= CSE 1
856 -- "Null object found"
857 -- java.lang.NullPointerException
858 -- com.example.mypackage1.<myclass1>.<mymethod1>{myclass1.java: line 56}
859 -- com.example.mypackage2.<myclass2>.<mymethod2>{myclass2.java: line 72}
860 -- com.example.mypackage13.<myclass13>.<mymethod13>{myclass13.java: line 25}

LOG FILE 870
871 -- EntryType=ERROR
872 -- Date= 11:00:00am 6/1/2017
873 -- HostName= HOST 2
874 -- ApplicationName=APP 2
875 -- CloudServiceEnvironment= CSE 1
876 -- "Null object found"
877 -- java.lang.NullPointerException
878 -- com.example.mypackage1.<myclass1>.<mymethod1>{myclass1.java: line 56}
879 -- com.example.mypackage22.<myclass22>.<mymethod22>{myclass22.java: line 33}
880 -- com.example.mypackage23.<myclass23>.<mymethod23>{myclass23.java: line 45}

.....

LOG FILE 8NN

LIST OF ERRORS 890

FIGURE 9

```
LIST OF PRODUCT PACKAGES 900 com.example.mypackage1—901 com.example.mypackage2—902 com.example.mypackage3—903 com.example.mypackage12—904
```

SYSTEM AND METHOD OF PROVIDING POST ERROR ANALYSIS FOR INSTANCES OF APPLICATIONS IN CLOUD SERVICE ENVIRONMENTS ON A PER USER BASIS

BACKGROUND

A conventional software error prediction system analyzes volumes of information gathered from across an entire system for patterns in sequences of events documented in the gathered information. The conventional software error prediction systems uses the patterns to predict potential future problems. The pattern analysis can involve machine learning techniques.

Conventional security breach alerting systems also analyze volumes of information gathered from across an entire system. The analysis involves determining security breaches in one part of the system that the perpetrators may launch against another part of the system or even against a different system.

With both types of systems, information technology specialists are informed about the problems. Both types of systems rely on gathering extensive information across the entire system in order to detect errors in one part of the system and to determine whether those errors apply to other parts of the system. Both types of systems also rely on real time notification of the determined problems. Both types of systems rely on taking action in one part of a system based on a problem that was determined for another part of the system. Various types of error systems also rely on modifying applications in the system to provide information describing errors.

SUMMARY

Various embodiments provide for performing post error analysis for instances of applications in cloud service environments on a per user basis. One embodiment provides for the instances of the applications executing in the cloud service environments that users interact with. Each of the cloud service environments includes a respective set of instances of the applications. Each of the cloud service environments and the respective set of instances is associated with a different one of the users. Errors are detected during the execution of the instances of the applications. Sets of log file information describing the errors are created. Each of the sets of log file information describes one of the errors. Log files are created. Each of the log files include one of the sets of log file information and an identification of a cloud service environment where an associated error occurred. The log files are categorized based on identifications of the cloud service environments. A post error analysis report including information from the categorized log files is provided for a particular cloud service environment whereby the post error analysis is performed on a per user basis.

An embodiment provides for tangible processor-readable storage device including instructions for a method of performing post error analysis for instances of applications in cloud service environments on a per user basis, wherein the tangible processor-readable storage device includes instructions executable by one or more processors for: executing the instances of the applications in the cloud service environments that users interact with, wherein each of the cloud service environments includes a respective set of instances of the applications and wherein each of the cloud service environments and the respective set of instances is associated with a different one of the users; detecting errors during the execution of the instances of the applications; creating sets of log file information describing the errors, wherein each of the sets of log file information describes one of the errors; creating log files that each include one of the sets of log file information and an identification of a cloud service environment where an associated error occurred; categorizing the log files based on identifications of the cloud service environments; and providing a post error analysis report including information from the categorized log files for a particular cloud service environment whereby the post error analysis is performed on a per user basis.

A further understanding of the nature and the advantages of particular embodiments disclosed herein may be realized by reference of the remaining portions of the specification and the attached drawings.

BRIEF DESCRIPTION OF THE DRAWINGS

FIG. 4 depicts a page that displays error information, according to one embodiment.

FIG. 6 depicts exception information, according to one embodiment.

FIG. 7 depicts error augmentation information, according to one embodiment.

FIG. 8 depicts log files in a log file repository, according to one embodiment.

FIG. 9 depicts a list of product packages, according to one embodiment.

DETAILED DESCRIPTION OF EMBODIMENTS

Overview of Discussion

QA engineers test systems to locate errors in the system. Log files may have been created for the errors. However, when the system adequately recovers from errors, the QA engineer may not have seen function issues that arise from those errors. Further, in conventional systems, the volume of created log files can overwhelm the QA engineers.

Therefore, according to various embodiments, different parts of the system are executed on behalf of different users. Errors for parts of a system that respective users interact with are analyzed and post error analysis reports are provided, for example, to a QA engineer on a per user basis. Therefore, error information from many different sources does not need to be gathered. Instead, the QA engineer is provided with a single source of error information in the form of a report for a particular user of the system.

Any action that is taken based on a post error analysis report would apply to the part of the system that the report documented errors for. For example, if the report indicates that there is a software bug in application A, then the action taken would be to report and fix the bug in application A. The errors can be addressed in the near future or sometime later in the future. Further, the reports are provided without modifying the logic of the applications. Embodiments are well suited for production environments as well as test environments.

An Example of a System

Figure 1:
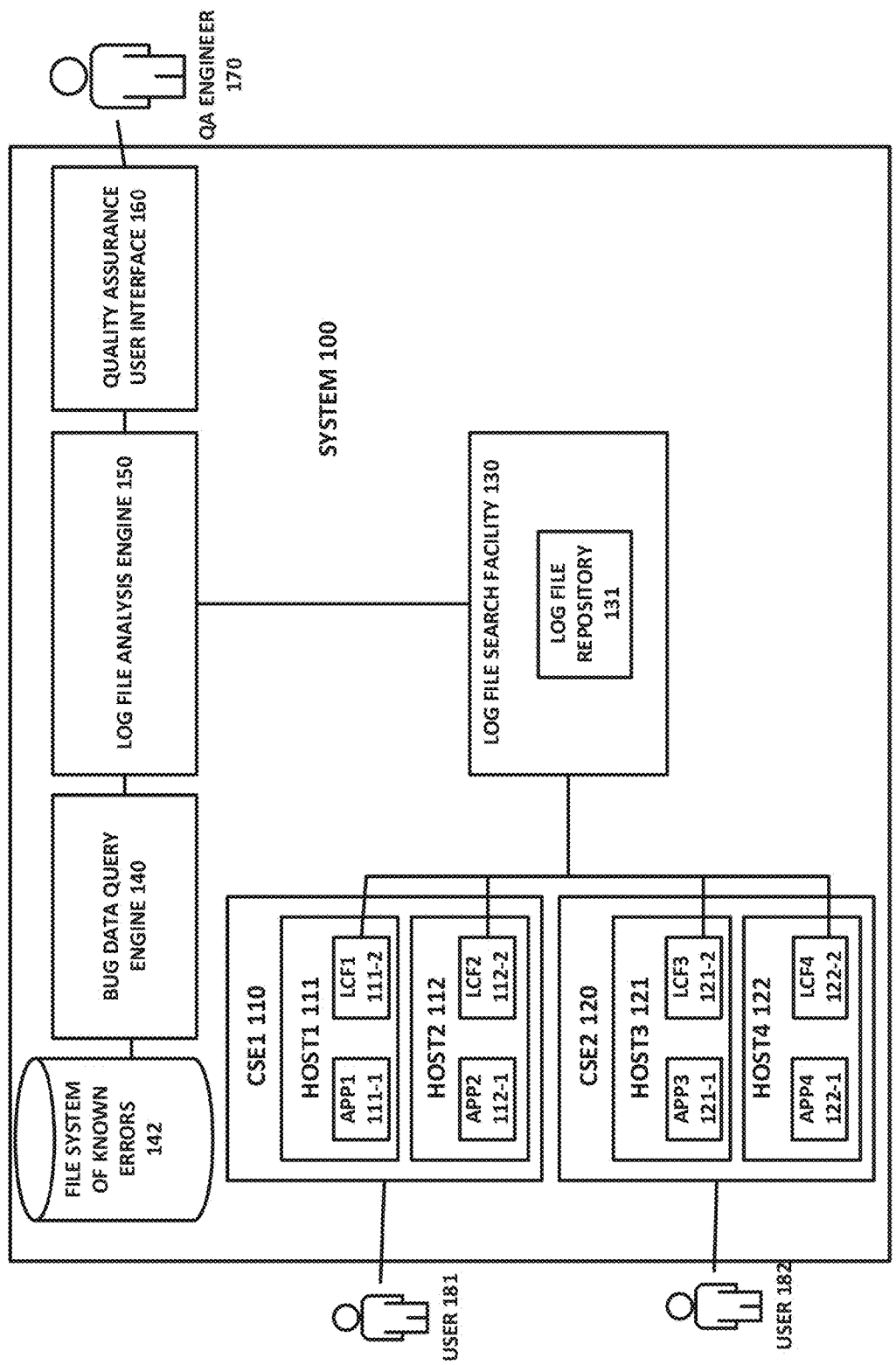
FIG. 1 depicts a block diagram of a system for performing post error analysis for instances of applications in cloud service environments on a per user basis, according to one embodiment.

FIG. 1 depicts a block diagram of a system for performing post error analysis for instances of applications in cloud service environments on a per user basis, according to one embodiment.

The system 100 includes a bug data query engine 140, a file system of previously debugged errors 142, a log file analysis engine 150, a QA user interface 160, a QA engineer 170, cloud service environments (CSEs) 110 and 120 with respective names CSE 1 and CSE 2, and a log file search facility 130. The bug data query engine 140 communicates with the file system 142. CSE 110 includes hosts 111 and 112. CSE 120 includes hosts 121 and 122. The hosts can be either hardware computer systems or virtual machines (VMs) installed on one or more hardware computer systems. Application instance 111 and log creation facility (LCF) 111-2 execute on host 111. Application instance 112-1 and LCF 112-2 execute on host 112. Application instance 121-1 and LCF 121-2 execute on host 121. Application instance 122-1 and LCF 122-2 execute on host 122. An application instance is an instance of an application. Two or more application instances may be instances of the same application. For example, application instance 121-1 and 111-1 may be instances of the same application for adding a consumer item to a cart. In another example, application instances 112-1 and 122-1 may be instances of the same application for billing the customer for the consumer item in the cart. User 181 interacts with CSE 110 and user 182 interacts with CSE 120.

According to one embodiment, the log file analysis engine 150 is implemented as a node.JS® application; the file system 142 is a Hadoop® Distributed File System (HDFS); the QA user interface 160 is implemented as a JQuery™/HyperText Markup Language (HTML) based application; the log creation facilities 111-2, 112-2, 121-2, 122-2 are implemented with Elastic™'s logstash from the Elasticsearch-Logstash-Kibana™ (ELK stack); and the log file search facility is implemented with Elastic™'s elasticsearch from the Elasticsearch-Logstash-Kibana™ (ELK stack);

The application instances 111-1, 112-1, 121-1, 122-1 of each of the CSEs 110, 120 execute in response to the requests of the respective users 181, 182. When an application instance encounters an exception, an exception handler for that type of exception gains control. Examples of exceptions include a null pointer was found, authorization failed, a class was not found, an instantiation exception, the method does not exist, an arithmetic exception, a class cast exception, and so on. The exception handler creates exception information describing that exception. A log creation facility 111-2, 112-2, 121-2, and 122-2 is associated with each of the application instances 111-1, 112-1, 121-1, 122-1. The log creation facility creates a log file for an exception from the application instance it is associated with and augments the exception information with error augmentation information.

Since each of the log creation facilities is associated with one application, one host, and one CSE, the log creation facilities know what host name, application instance name and cloud service environment name to augment the log files with. The log files with their respective augmentations are communicated to the log file search facility 130 where they are stored in the log files repository 131. According to one embodiment, the log creation facilities are configured to poll service logs and store the logs in the log file repository 131 of the log file search facility 130. According to one embodiment, the log file search facility 130 is a central ElasticSearch™ server. When requested, the log file search facility 130 provides a list of errors from the repository 131 to the log file analysis engine 150, as will become more evident.

Figure 2:
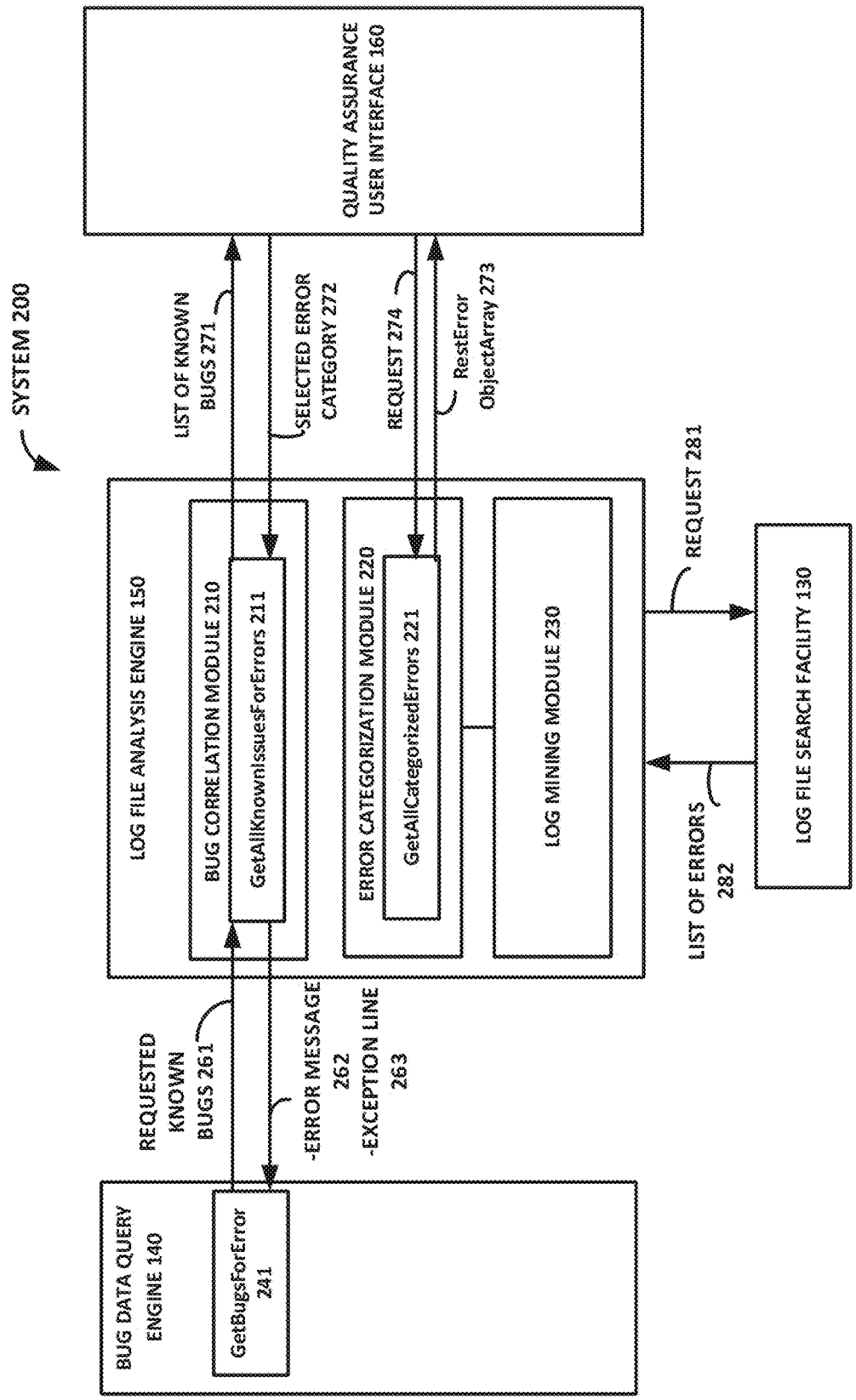
FIG. 2 depicts a system, according to one embodiment.

FIG. 2 depicts a system 200, according to one embodiment. System 200 provides more detail of various parts of system 100.

Bug data query engine 140 provides GetBugsForError Representational State Transfer (REST) Application Program Interface (API) 241. Log file analysis engine 150 includes a bug correlation module 210, an error categorization module 220 and a log mining module 230. The bug correlation module 210 provides a GetAllIssuesForErrors REST API 211. The error categorization module 220 provides a GetAllCategorizedErrors REST API 221.

The QA UI 160 receives a request from the QA engineer requesting error information for a specified CSE. The QA UI 160 invokes the GetAllCategorizedErrors Rest API 221 requesting 274 error information for the specified CSE. In response, the log mining module 230 requests 281 log file information for that specified CSE from the log file search facility 130. The log file search facility 130 obtains the requested log files from the log file repository 131 and passes back the log files in the list of errors 282. Module 230 provides the list of errors 282 to module 220. The error categorization module 220 creates a RestErrorObjectArray 273 by processing the list of errors 282. The processing of the list of errors 282 includes correlating and categorizing error information in the list of errors 282 to create the RestErrorObjectArray 273. Similar or identical log files are correlated with each other to determine categorizations. A count of the similar or identical log files for an error category is determined. Error information along with the count is provided for each of the error categories. Each of the error categories are objects in the RestErrorObjectArray 273. The error information in the RestErrorObjectArray 273 is displayed to the QA engineer 170. The QA engineer 170 can select one or more of the displayed error categories. The GetAllKnownIssuesForErrors REST API 211 receives the one or more selected error categories 272. The error message 262 and exception line 263 associated with each of the selected error categories 272 is communicated from the bug correlation module 210 to the GetBugsForError REST API 241 of the engine 140. The bug data query engine 140 obtains a list of requested known bugs from the file system 142 and communicates the list of requested known bugs 261 back to module 210 in the form of a tuple<error object, list of known bugs>. A list of known bugs 271 is then communicated from the REST API 211 to the user interface 160 where it is displayed to the QA engineer.

Cloud Service Environment

According to one embodiment, a CSE 110, 120 (FIG. 1) includes multiple hosts executing multiple application instances for providing a type of service. An example of a type of service is an online shopping service. In this case, one of the applications for the online shopping service may enable a customer to add a consumer item to a shopping cart and another application may enable the customer to provide billing information and authorize billing of the consumer item. In this case, the customer is an example of a user 181, 182 (FIG. 1) and instances of the applications can be executed in each CSE that users interact with to use the online shopping service. Each CSE has an identification, such as a name, that uniquely identifies it. As depicted in FIG. 1, CSE1 and CSE2 are unique identifications for the respective CSEs 110, 120. An application is also referred to as a microservice.

Quality Assurance User Interface

Figure 3:
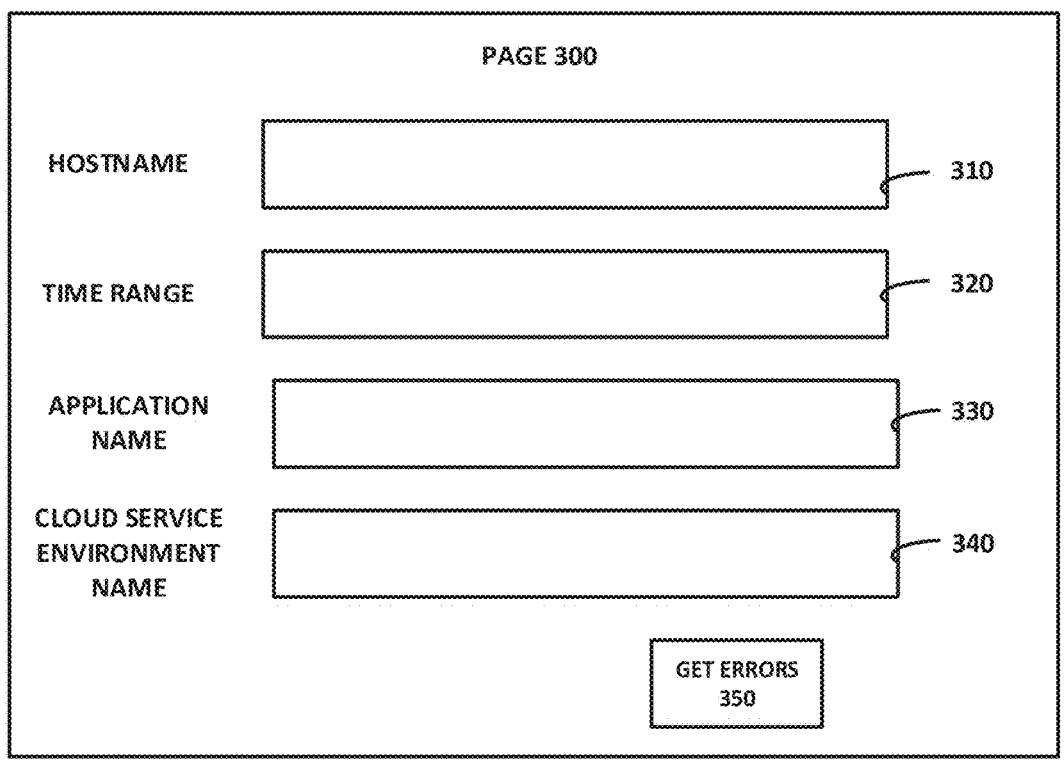
FIG. 3 depicts a page for the quality assurance (QA) engineer to enter information, according to one embodiment.
Figure 5:
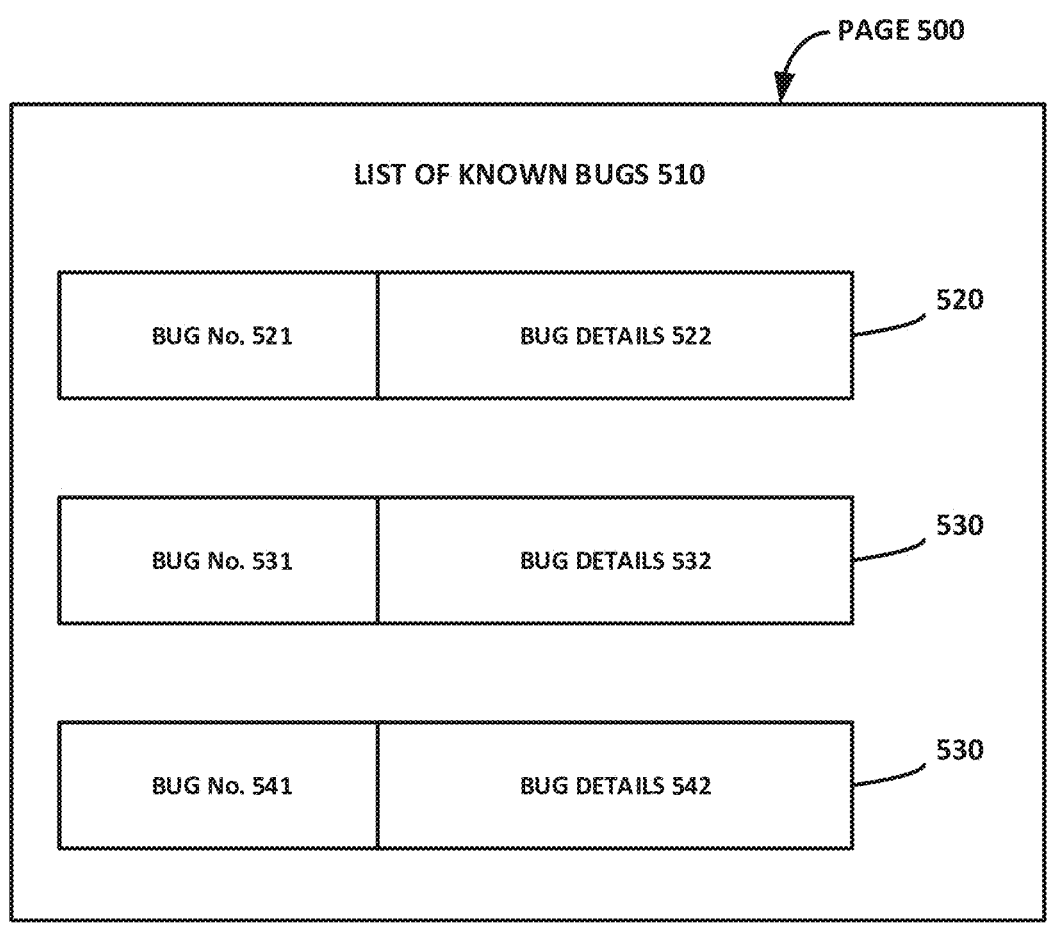
FIG. 5 depicts a page for displaying the list of known bugs, according to one embodiment.

FIGS. 3, 4 and 5 depict pages 300, 400, and 500 of the quality assurance user interface 160, according to one embodiment.

FIG. 3 depicts a page 300 for the QA engineer 170 to enter one or more pieces of information specifying the level of error information that they are requesting, according to one embodiment. The page 300 includes data entry fields 310, 320, 330, 340 for specifying respectively a host name, time range, an application name, and a CSE name, and a get errors button 350. According to one embodiment, the engineer could specify just the CSE name at data entry field 340. The time range could be specified as a range of days, a range of times within a day, or a range that spans days. The time range could include dates or dates and times. Many of the examples provided herein shall assume that the user specified just the CSE name. Embodiments are well suited for specifying various subsets of the data fields 310-340. For example, the user may specify only the CSE name, or the CSE name and a host name, or a CSE name, a host name and an application name, or all four data entry fields. If the user enters only the CSE name, error information for all of the application instances on all of the hosts in the CSE will be provided. If the user enters only the CSE name and a host name, then error information for the application instances in that host in that CSE will be provided, and so on.

FIG. 4 depicts a page 400 that displays error information from the RestErrorObjectArray 273, according to one embodiment. The page 400 depicts a table 410 with several error categories 420, 430. FIG. 4 may include more or less information than depicted in FIG. 4. The page 400 may include any type of information provided by log files, as discussed herein. Each of the error categories include information describing the respective error category and the respective counts, as will be discussed in more detail hereinafter. The QA engineer can select one or more of the categories 420, 430 and select the "get known errors" button 450 to obtain list(s) of the known bugs for the respective one or more selected categories.

FIG. 5 depicts a page 300 for displaying the list of known bugs 510, according to one embodiment. The displayed list of known bugs 510 depicts a row 520, 530, 540 for each of the bugs in the list of known Bugs 271 that the QA UI 160 (FIG. 1) receives from the REST API 211. Each row 520-540 depicts a bug no. 521, 531, 541 and bug details 522, 532, 542. The bug no. is an identifier that uniquely identifies the bug. Examples of bug details include the status of providing a patch for fixing the bug, such as available or pending, a date of availability for the patch, the name of the patch, and prerequisites for the patch and so on.

Exception Information

FIG. 6 depicts exception information 600, according to one embodiment.

When an application instance encounters an exception, such as a null pointer or authorization failed, an exception handler, according to one embodiment, for that type of exception gains control. The exception handler creates exception information 600 describing that exception. The exception information 600 includes an exception message 601, a main exception object 602, and an error trace stack 620. The exception message is text describing the type of exception error that occurred. As depicted in exception information 600, the type of exception error was "a null object found." Another type of exception error is that authorization failed. The main exception object 602 specifies the object that implements the exception handler. The error trace stack 620 includes code lines 611, 612, 613. Each of the code lines 611-613 specify the method, the class the method is in, the package the class is in and a line of code that either invoked the next method up in the stack or in the case of the uppermost code line 611, the line of code where the exception occurred. Code line 611 specifies that mymethod1 is in myclass1.java in com.example.mypackage1, and so on with code lines 612 and 613. The error trace stack 620 also describes the order in which the methods communicated with each other. For example, at line 47 mymethod3 invoked mymethod 2; at line 72 mymethod2 invoked mymethod 1. Then the "null object found" exception occurred at line 56 of mymethod 1. According to one embodiment, an exception information 600 is a text description of the error.

Although many embodiments are illustrated in the context of exceptions and exception handlers, embodiments are well suited to errors that are not handled by exception handlers. For example, the errors may be for bugs in application instances that include logic that creates error information similar to the exception information 600. More specifically in the case of null pointer type errors, the application instance logic could include instructions that if a pointer equals null, then create information that is the same or similar to exception information 600.

Error Augmentation Information

FIG. 7 depicts error augmentation information 700, according to one embodiment.

The log creation facilities 111-2, 112-2, 121-2, and 122-2 create log files for the exceptions from the application instances that they are associated with and augment the exception information 600 with error augmentation information 700. The error augmentation information 700 includes an EntryType 701, a date/time field 702, a hostname field 703, an application name field 704 and a cloud service environment name field 705. The EntryType field 701 is set to the value "ERROR." The date/time field 702 specifies the date and time that the error occurred. The hostname field 703 specifies the hostname of the system where the error originated. Examples of hostnames are host1, host2, host3, and host4 for respective hosts 111, 112, 121, and 122. The application name field 704 specifies the name of the application instance that generated the error. Examples of application names are app1, app2, app3, and app4 for respective application instances 111-1, 112-1, 121-1, and 122-1. The cloud service environment field 705 specifies the name of the cloud service environment. Examples of cloud service environment names are CSE1 and CSE2. Since each of the log creation facilities is associated with one application, one host, and one CSE, the log creation facilities know what host name 703, application instance name 704 and cloud service environment name 705 to augment the log files with.

According to one embodiment, the hosts are application servers that are running and configured with Logstash, providing the log creation facilities, as discussed herein. The LogStash configuration, according to one embodiment, is written as a grok parser that tells logstash how to parse the logs and send them to an elasticsearch based log file search facility 130 (FIG. 1). When an error occurs on a host, the entire stack trace is sent to the log file search facility 130 as a single entry by LogStash. Each entry sent to the log file search facility 130 includes error augmentation information

700 and exception information 600 (FIG. 6). With the error augmentation information 700 attached to each of the error entries sent to the log file search facility 130, one can query all of the errors for a given CSE using the EntryType 701 and the CloudServiceEnvironment 705 attributes and categorize those entries accordingly without having to worry about collecting the errors from hosts for other cloud service environments.

Log Files Repository

FIG. 8 depicts log files 810, 830, 850, 870, 8NN in a log file repository 800, according to one embodiment. The log file repository 800 is an example of the log file repository 131 (FIG. 1) and list of errors 890 (FIG. 8) is an example of list of errors 282 (FIG. 2)

Each of the log files include information created by an exception handler along with the error augmentation information. For example, log file 810 includes error augmentation information 811-815 and exception information 816-820; log file 830 includes error augmentation information 831-835 and exception information 836-840; log file 850 includes exception information 851-855 and error augmentation information 856-860; log file 870 includes exception information 871-875 and error augmentation information 876-880.

For the sake of simplicity, it is assumed that the log files 810, 830, 850 and 870 appear consecutively in the log file repository 800. However, typically, these log files may be interspersed with log files from other application instances on other hosts for other CSEs. For example, the log files for application instances 111-1, 112-1, 121-1, and 122-1 (FIG. 1) may be interspersed with each other in the log file repository 131. In this illustration, the list of errors 890 includes log files 810, 830, 850 and 870. The list of errors 890 is an example of list of errors 282 depicted in FIG. 2.

Referring to FIGS. 1 and 8, the log file search facility 130 persists the log files sent to it in the repository 131 for a period of time and then purges the log files. For example, log files may be retained for a month. The retention period can be configured by a user. The entire repository 131 (FIG. 1), 800 (FIG. 8) is available to be queried. More specifically, the engine 150 can interact with the log file search facility 130 to query the log files in the repository 131 (FIG. 1), 800 (FIG. 8) for a CSE that the QA engineer is interested, for example, because they are testing that CSE.

According to one embodiment, the repository 131 (FIG. 1), 800 (FIG. 8) is not a relational database. Instead, the repository 131 (FIG. 1), 800 (FIG. 8) is an extremely large text file and the search facility 130 (FIG. 1), 800 (FIG. 8) locates requested log files based on tags, such as EntryType, Date, HostName, ApplicationName, and CloudServiceEnvironment. A relational database is not well suited for an extremely amount of log file information. According to one embodiment, implementing the search facility 130 (FIG. 1), 800 (FIG. 8) with Elastic™'s elasticsearch from the Elasticsearch-Logstash-Kibana™ (ELK stack) enables scalable and efficient searches of extremely large text files for requested log files.

List of Product Packages

FIG. 9 depicts a list of product packages 900, according to one embodiment.

As depicted in FIG. 9, the list of product packages 900 that specifies package names 901, 902, 903, and 904. In this example, the respective package names 901-904 are com.example.mypackage1, com.example.mypackage2, com.example.mypackage3, and com.example.mypackage12.

The list 900 is used in determining the relevant exception line for log files in a log file repository 800. The relevant exception line is the highest code line in an error trace stack that is also in the list of product packages 900. For example, referring to the error trace stack that includes lines 836-840 for log file 830 in FIG. 8, the online code line that is also in the list 900 is 840 The code line 840 in the repository 800 in FIG. 8 and the line 904 in FIG. 9 both specify com.example.mypackage12. Therefore, code line 840 is the relevant exception line for the log file 830. The respective relevant exception line for log files 810, 850, and 870 are 818, 858, and 878, which specify com.example.mypackage1.

Typically, quality assurance personnel would want the first code line in an error stack trace to be the relevant exception line. The relevant exception line is the code line that is of the most interest to the quality assurance personnel. It may be a code line for a type of error that they have not handled well in the past.

The relevant exception lines are used as part of categorizing the exception errors. For example, since the log files 810, 850, 870 (FIG. 8) all have an exception message for "null object found" and the relevant exception lines 818, 858, and 878 (FIG. 8) all specify the same product package com.example.mypackage1 from line 904 (FIG. 9) of the list of product packages 900 (FIG. 9), they are assigned the error category 420 (FIG. 4). Error category 420 in FIG. 4 has a count 424 of 3 since three log files 810, 850, 870 (FIG. 8) belong to that error category 420 (FIG. 4). The exception message 421 in FIG. 4 "null object found" corresponds with lines 816, 856, and 876 in FIG. 8. The main exception object 422 in FIG. 4 corresponds with the lines 817, 857, and 877 of FIG. 8.

Still referring to FIGS. 4, 8 and 9, the error category 430 specifies a count 434 of 1 because only one error log 830 is associated with it. Error category 430 specifies an exception message 431 of "authentication failed" obtained from line 836 of the log file 830. It also specifies the main exception object 432 that was obtained from line 837 of log file 830 and a relevant exception line 433 obtained from line 840 of the log file 830.

Error categorization module 220 (FIG. 2) processes the list of errors 890 (FIG. 8) based on the list of product packages 900 (FIG. 9) to determine the error categories 420, 430 (FIG. 4). More specifically, as discussed herein, error categorization module 220 (FIG. 2) compares the list of product packages 900 (FIG. 9) log files 810, 830, 850, 870 in the list of errors 890 to determine the relevant exception line for each log file, determines how to categorize the log files, for example, based on the exception message and the relevant exception lines of the respective log files, and determines the count 424, 434 (FIG. 4) of log files in each error category 420, 430 (FIG. 4).

Examples of Methods

Figure 10:
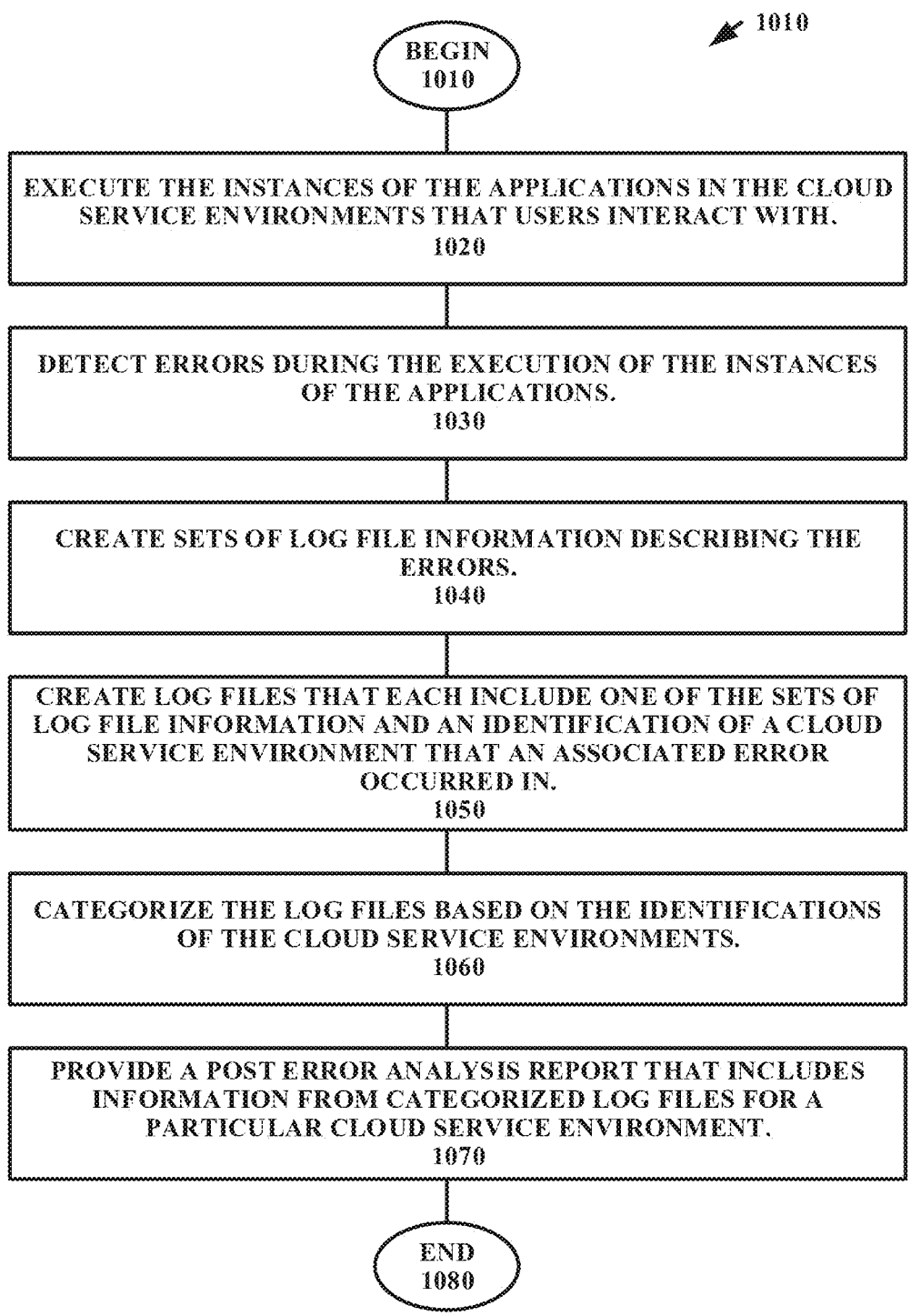
FIG. 10 depicts a flowchart of a method of performing post error analysis for instances of applications in cloud service environments on a per user basis, according to one embodiment.

FIG. 10 depicts a flowchart 1000 of a method of performing post error analysis for instances of applications in cloud service environments on a per user basis, according to one embodiment.

At 1010, the method starts.

At 1020, execute the instances of the applications in the cloud service environments that users interact with.

For example, referring to FIG. 1, the instances 111-1, 112-1, 121-1, and 122-1 of applications are executed in respective cloud service environments 110 and 120 that the users 181 and 182 interact with. Each of the cloud service environments includes a respective set of instances of the applications. For example, CSE 110 includes instances 111-1 and 112-1 and CSE 120 includes instances 121-1 and 122-1. In this illustration, assume that instances 111-1 and 121-1 are instances of the same application, such as an application for adding a consumer item to a cart. Also in this illustration, assume that instances 121-1 and 122-1 are instances of the same application, such as an application for billing the customer for the consumer item that they added to their shopping cart. The application instances of a CSE form a set of instances. Therefore, the instances 111-1 and 112-1 form one set of instances and instances 121-1 and 122-1 form another set of instances in this illustration. Each of the cloud service environments and the respective set of instances is associated with a different one of the users. For example, in this illustration, user 181 interacts with CSE 110 and user 182 interacts with CSE 120. The application instances 111-1, 112-1, 121-1, 122-1 of each of the CSEs 110, 120 execute in response to the requests of the respective users 181, 182 and provide requested information back to the respective users 181, 182.

At 1030, detect errors during the execution of the instances of the applications.

For example, when an application instance 111-1, 112-1, 121-1, and 122-1 (FIG. 1) encounters an error, such as a null pointer or authorization failed, an exception handler for that type of error gains control. More specifically, Java-.lang.NullPointerException handler would gain control in response to a "null object found" error occurring in an application instance.

At 1040, create sets of log file information describing the errors.

For example, referring to FIG. 6, the Java.lang.NullPointerException handler is specified as the main exception object 602. The Java.lang.NullPointerException handler creates exception information 600, describing the "null object found" error. The main exception object 602 is an example of an exception handler dedicated for handling "null object found" types of exception errors, as specified in the exception message 601. The exception information 600 is an example of a set of log file information that describes an error. There is a set of log information for each detected error.

At 1050, create log files that each include one of the sets of log file information and an identification of a cloud service environment that an associated error occurred in.

For example, one of the log creation facilities 111-2, 112-2, 121-2, and 122-2 (FIG. 1) is associated with each of the application instances 111-1, 112-1, 121-1, and 122-1. For example, LCF 111-2 is associated with only application instance 111-1; LCF 111-2 is associated with only application instance 112-1, and so on. The log creation facility 111-2, 112-2, 121-2, and 122-2 creates a log file for the errors from the application instance 111-1, 112-1, 121-1, and 122-1 it is associated with by augmenting the exception information 600 (FIG. 6) with error augmentation information 700 (FIG. 7). Since each of the log creation facilities is associated with one application, one host, and one CSE, the log creation facilities know what host name 703, application instance name 704 and cloud service environment name 705 to augment the log files with. The log files 810, 830, 850, and 870 (FIG. 8) with their respective augmentations are communicated to the log file search facility 130 (FIG. 1) where they are stored in the log files repository 131 (FIG. 1), 800 (FIG. 8).

According to one embodiment, each of the log files are augmented with an identifier that uniquely identifies only one of the users. That identifier could be any one or more of an application instance name, a host name, and a CSE name. Each CSE and its associated application instances and hosts are associated with only one user. Therefore, any one or more of a CSE and corresponding application instance name(s) or host name(s) to uniquely identify one of the users, and, thus to augment log files to provide reports on a per user basis. For similar reasons, a CSE name, or a name of an application instance or a host that resides in that CSE can be used to identify a CSE and in turn the user of that CSE.

At 1060, categorize the log files based on the identifications of the cloud service environments.

For example, the QA UI 160 (FIG. 1) receives a request from the QA engineer requesting error information for a specified CSE. The QA UI 160 invokes the GetAllCategorizedErrors Rest API 221 (FIG. 2) with a request 274 (FIG. 2) for error information for the specified CSE. In response, the log mining module 230 (FIG. 2) requests 281 log file information for that specified CSE from the log file search facility 130 (FIG. 1). Embodiments are well suited to requesting log file information based on host name, time range, application name and so on, as depicted in page 300 (FIG. 3), in addition or instead of the CSE name. As can be seen, each application instance and each host is associated with one user 181, 182. Therefore, any one or more of a CSE name, application name, or host can be used for providing a post error analysis report, as depicted in FIG. 4, on a per user basis, as discussed herein.

The log file search facility 130 (FIG. 1) obtains the requested log files from the log file repository 131 (FIG. 1), 800 (FIG. 8) and passes back the requested log files in the list of errors 282 (FIG. 2), 890 (FIG. 8). More specifically, the log file search facility 130 (FIG. 1) provides a list of errors 282 (FIG. 2), 890 (FIG. 8) from the repository 131 (FIG. 1), 800 (FIG. 8) to the log file analysis engine 150 (FIG. 1).

The log mining module 230 (FIG. 2) provides the list of errors 282 (FIG. 2), 890 (FIG. 8) to the error categorization module 220 (FIG. 2). The error categorization module 220 creates a RestErrorObjectArray 273 by processing the list of errors 282 (FIG. 2), 890 (FIG. 8). The processing of the list of errors 282 (FIG. 2), 890 (FIG. 8) includes correlating and categorizing error information in the list of errors 282 (FIG. 2), 890 (FIG. 8) to create the RestErrorObjectArray 273. For example, as discussed herein, similar or identical log files are correlated with each other to determine the error categories 420, 430 (FIG. 4). According to one embodiment, two or more log files in a list of errors are identical if all of the information in each of the log files are identical with each other. Two or more log files in a list of errors will be considered at least similar enough to be included in the same error category, if their respective exception message 421, 431 (FIG. 4), 601 (FIG. 6) and relevant exception lines 423, 433 (FIG. 4) are the same.

Referring to FIG. 4, a count 424, 434 of the similar or identical log files for an error category 420, 430 is determined, as discussed herein. Error information 421, 422, 423, 431, 432, 433 along with the count is associated with each of the error categories. Each of the error categories are obtained from objects in the RestErrorObjectArray 273 (FIG. 2).

At 1070, provide a post error analysis report that includes information from categorized log files for a particular cloud service environment whereby the post error analysis is performed on a per user basis.

For example, the RestErrorObjectArray 273 (FIG. 2) is communicated from the REST API 211 (FIG. 2) to the QA UI 160 (FIGS. 1 and 2). The error information in the RestErrorObjectArray 273 (FIG. 2) is displayed to the QA engineer 170 (FIG. 1), for example, using page 400 (FIG. 4).

The page 400 is an example of a post error analysis report. Page 400 depicts error categories 420 and 430 that have information from categorized log files 810, 830, 850, and 870, as discussed herein. The RestErrorObjectArray 273 has an object for each of the error categories 420 and 430 and would include at least the information depicted in error categories 420 and 430. The objects in the RestErrorObjectArray 273 may include more information from respective log files than what is displayed on page 400.

At 1080, the method ends.

The QA engineer 170 (FIG. 1) can select one or more the error categories 420, 430 (FIG. 4). Assume in this illustration that one error category 420 is selected. The GetAllKnownIssuesForErrors REST API 211 (FIG. 2) receives the selected error category 272 (FIG. 2). The error message 262 and exception line 263 (FIG. 2) associated with the selected error category 272 (FIG. 2) is communicated from the bug correlation module 210 (FIG. 2) to the GetBugsForError REST API 241 (FIG. 2). For example, assuming that error category 420 (FIG. 4) is the selected error category 272 (FIG. 2), then the error message 262 (FIG. 2) is set to the exception message 421 (FIG. 4) and the exception line 263 (FIG. 2) is set to the relevant exception line 423 (FIG. 4). The bug data query engine 140 (FIG. 1) obtains a list of requested known bugs from the file system 142 (FIG. 1) and communicates the list of requested known bugs 261 (FIG. 2) back to module 210 (FIG. 2), for example, in the form of a tuple<error object, list of known bugs>. A list of known bugs 271 (FIG. 2) is then communicated from the REST API 211 (FIG. 2) to the user interface 160 (FIG. 1) where it is displayed to the QA engineer 170 (FIG. 1) using page 500 (FIG. 5).

An embodiment provides for augmenting each of the sets of log file information with additional information for the associated error, wherein the additional information includes an entry type, a date that the associated error occurred, hostname that the associated error occurred on, a name of an application the associated error occurred in, and the identification of the cloud service environment that the associated error occurred in. An example of a set of log file information is the exception information 600 (FIG. 6). An example of additional information is error augmentation information 700 (FIG. 7) that includes an entry type 701, a date 702, a hostname 703, an application name 704, and a cloud service environment name 705. The application name 704 is the name of an application instance.

An embodiment provides for wherein the creating of the sets of log file information further comprises: creating error related information for a particular error, wherein the error related information includes an exception message, a relevant exception line and a stack trace. An example of error related information is exception information 600 (FIG. 6) that includes an exception message 601, a relevant exception line, and an error stack trace 620. The relevant exception line would be one of the code lines 611-613 determined based on the list of product packages 900 (FIG. 9), as discussed herein.

An embodiment provides for wherein the categorizing of the log files further includes: categorizing errors with at least similar error related information. For example, as discussed herein, log files 810, 850, and 870 are at least similar.

An embodiment provides for wherein the method further comprises: counting number of errors with the at least similar error related information in the log files; and providing in the post error analysis report, information about the categorizing of the errors with at least similar error related information and the number of errors with the at least similar error related information. For example, the table 410 (FIG. 4) is an example of a post error analysis report error categories 420 and 430 and counts 424 and 434 of the number of errors associated with each of the error categories 420 and 430.

An embodiment provides for determining if any of the errors have been previously debugged; and indicating which of the errors have been previously debugged in the post error analysis report. For example, the file system of previously debugged errors 142 can provide a list of requested known bugs 261. The bug details 522, 532, 542 can indicate which of the errors have been previous debugged. For example, the bug details can indicate that the error is in the process of being debugged or whether the patch for fixing the bug is available.

An embodiment provides for executing the instances on hosts, wherein each of the instances is executed on a different one of the hosts. For example, each of the application instances 111-1, 112-1, 121-1, and 122-1 execute on only one of the hosts 111, 112, 121, and 122.

An embodiment provides for wherein the method is performed without modifying the applications. For example, if the instances 111-1 and 121-1 are instances of an application to add a consumer item to a cart and instances 112-1 and 122-1 are instances of an application to bill the customer for the consumer item in the cart, the shopping cart application and the bill customer application have not been modified or are not required to be modified in order to perform the method of flowchart 1000 or any other embodiments described herein.

Some conventional systems require that the applications are modified, for example, by embedding a plugin called a "notifier" into their application. For example, if the application is a java application, a java based notifier may be embedded in the application. The java based notifier may rely on using a java script library in the application. Further, code may need to be added to the application to utilize the notifier and to communicate data to the conventional system. Conventional types of analysis tracking tools frequently require developers to embed at least certain custom code into their applications so that an end system can detect the type of event or issue that is of interest.

An embodiment provides for associating log creation facilities with the instances, wherein each of the instances is associated with a different one of the log creation facilities. For example, LCF 111-2 is associated with application instance 111-1; LCF 112-2 is associated with application instance 112-1; LCF 121-2 is associated with application instance 121-1; and LCF 122-2 is associated with application instance 122-1.

An embodiment provides for wherein the creating of the log files further comprises: augmenting, performed by log creation facilities, the sets of log file information with the identifications of the cloud service environments, wherein there is one identification with each of the cloud service environments; and creating, performed by the log creation facilities, the log files that each include one of the sets of log file information and the identification of the cloud service environment where the associated error occurred. For example, the log creation facilities 111-2, 112-2, 121-2, and 122-2 (FIG. 1) augment sets of log file information, such as exception information 600 (FIG. 6), with the identifications 705 (FIG. 7), such as CSE1 and CSE2, of cloud service environments 110, 120 (FIG. 1). Since each of the log creation facilities is associated with one application, one host, and one CSE, the log creation facilities know what host name 703, application instance name 704 and cloud service environment name 705 to augment the log files with. The log creation facilities 111-2, 112-2, 121-2, and 122-2 (FIG. 1) create the log files 810, 830, 850, 870, and 8NN (FIG. 8). Each of the log files 810, 830, 850, 870, and 8NN (FIG. 8) include one set of log file information and the identification of the cloud service environment where the associated error occurred. For example, lines 816-820 is one set of log file information for log file 810 and an identification, CSE1, of a cloud service environment 110 is specified at line 815 of that log file 810.

A Computer Readable Medium and an Apparatus

Unless otherwise specified, any one or more of the embodiments described herein can be implemented using processor readable instructions which reside, for example, in tangible processor-readable storage device of a computer system or like device. The tangible processor-readable storage device can be any kind of physical memory that instructions can be stored on. Examples of the tangible processor-readable storage device include but are not limited to a disk, a compact disk (CD), a digital versatile device (DVD), read only memory (ROM), flash, and so on. As described above, certain processes and operations of various embodiments of the present invention are realized, in one embodiment, as a series of processor readable instructions (e.g., software program) that reside within tangible processor-readable storage device of a computer system and are executed by one or more processors of the computer system. When executed, the instructions cause a computer system to implement the functionality of various embodiments of the present invention. For example, the instructions can be executed by a processor. The processor is a hardware processor, such as a central processing unit, associated with the computer system. The tangible processor-readable storage device is hardware memory and the one or more processors are hardware processors.

An embodiment provides for tangible processor-readable storage device including instructions for a method of performing post error analysis for instances of applications in cloud service environments on a per user basis, wherein the tangible processor-readable storage device includes instructions executable by one or more processors for: executing the instances of the applications in the cloud service environments that users interact with, wherein each of the cloud service environments includes a respective set of instances of the applications and wherein each of the cloud service environments and the respective set of instances is associated with a different one of the users; detecting errors during the execution of the instances of the applications; creating sets of log file information describing the errors, wherein each of the sets of log file information describes one of the errors; creating log files that each include one of the sets of log file information and an identification of a cloud service environment where an associated error occurred; categorizing the log files based on identifications of the cloud service environments; and providing a post error analysis report for a particular cloud service environment whereby the post error analysis is performed on a per user basis.

An embodiment provides for an apparatus for performing post error analysis for instances of applications in cloud service environments on a per user basis comprising: one or more processors; and a tangible processor-readable storage device including instructions for: executing the instances of the applications in the cloud service environments that users interact with, wherein each of the cloud service environments includes a respective set of instances of the applications and wherein each of the cloud service environments and the respective set of instances is associated with a different one of the users; detecting errors during the execution of the instances of the applications; creating sets of log file information describing the errors, wherein each of the sets of log file information describes one of the errors; creating log files that each include one of the sets of log file information and an identification of a cloud service environment where an associated error occurred; categorizing the log files based on identifications of the cloud service environments; and providing a post error analysis report for a particular cloud service environment whereby the post error analysis is performed on a per user basis.

Example Computer Environment

Figure 11:
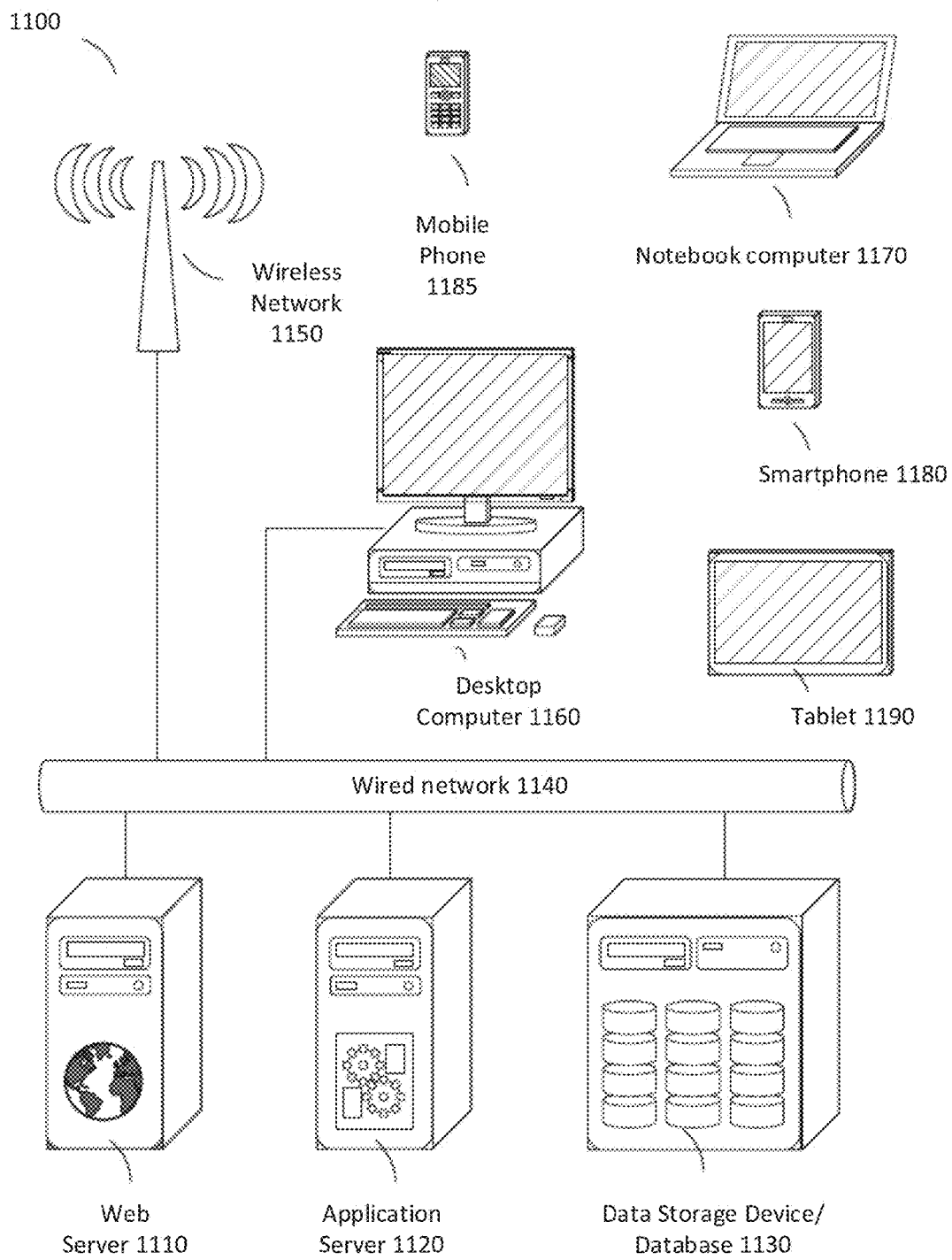
FIG. 11 is a general block diagram of a system and accompanying computing environment usable to implement the embodiments of FIGS. 1-10.

FIG. 11 is a general block diagram of a system 1100 and accompanying computing environment usable to implement the embodiments of FIGS. 1-10. The example system 1100 is capable of supporting or running various hardware and/or software modules and associated methods discussed with reference to FIGS. 1-10. Note that certain embodiments may be implemented using one or more standalone applications (for example, residing in a user device) and/or one or more web-based applications implemented using a combination of client-side and server-side code.

The general system 1100 includes user devices 1160-1190, including desktop computers 1160, notebook computers 1170, smartphones 1180, mobile phones 1185, and tablets 1190. The general system 1100 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 1100 is shown with five user devices, any number of user devices can be supported.

A web server 1110 is used to process requests from web browsers and standalone applications for web pages, electronic documents, enterprise data or other content, and other data from the user computers. The web server 1110 may also provide push data or syndicated content, such as RSS feeds, of data related to enterprise operations.

An application server 1120 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 1120 are adapted to process input data and user computer requests and can store or retrieve data from data storage device or database 1130. Database 1130 stores data created and used by the data applications. In an embodiment, the database 1130 includes a relational database that is adapted to store, update, and retrieve data in response to SQL format commands or other database query languages. Other embodiments may use unstructured data storage architectures and NoSQL (Not Only SQL) databases.

In an embodiment, the application server 1120 includes one or more general-purpose computers capable of executing programs or scripts. In an embodiment, web server 1110 is implemented as an application running on the one or more general-purpose computers. The web server 1110 and application server 1120 may be combined and executed on the same computers.

An electronic communication network 1140-1150 enables communication between user computers 1160-1190, web server 1110, application server 1120, and database 1130. In an embodiment, networks 1140-1150 may further include any form of electrical or optical communication devices, including wired network 1140 and wireless network 1150. Networks 1140-1150 may also incorporate one or more local-area networks, such as an Ethernet network, wide-area networks, such as the Internet; cellular carrier data networks; and virtual networks, such as a virtual private network.

The system 1100 is one example for executing applications according to an embodiment of the invention. In another embodiment, web server 1110, application server 1120, and optionally database 1130 can be combined into a single server computer application and system. In a further embodiment, virtualization and virtual machine applications may be used to implement one or more of the web server 1110, application server 1120, and database 1130.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1-10, a quality assurance user interface 160 can be implemented on a client computing device, such as a desktop computer 1160, notebook computer 1170, smartphone 1180, mobile phone 1185, tablet 1190, of FIG. 11 and/or other computing devices. In a particular example embodiment, the user computing devices 1160-1190 run browsers, e.g., used to display the user interfaces. User interface 160 may be viewed from a client computing device, such as a desktop computer 1160, notebook computer 1170, smartphone 1180, mobile phone 1185, tablet 1190, of FIG. 11 and/or other computing devices.

In a particular example embodiment, browsers of the desktop computer 1160, notebook computer 1170, smartphone 1180, mobile phone 1185, tablet 1190 of FIG. 11 connect to the Internet, represented by the wired network 1140 and/or wireless network 1150 as shown in FIG. 11, to access one or more network-coupled servers, databases, and/or associated cloud-based functionality, as represented by the modules of FIG. 1. For example, one or more of the web server 1110 and/or application server 1120 shown in FIG. 11 may be used to host software corresponding to the modules for 140, 150, 130, 111-1, 111-2, 112-1, 112-2, 121-1, 121-2, 122-1, and 122-2 of FIGS. 1 and 2, as detailed more fully below. One or more databases 1130 as shown in FIG. 11 may be used to host a database, such as database 142. The log file repository 131 (FIG. 1) can be stored in a data storage device that communicates with network 1140.

Figure 12:
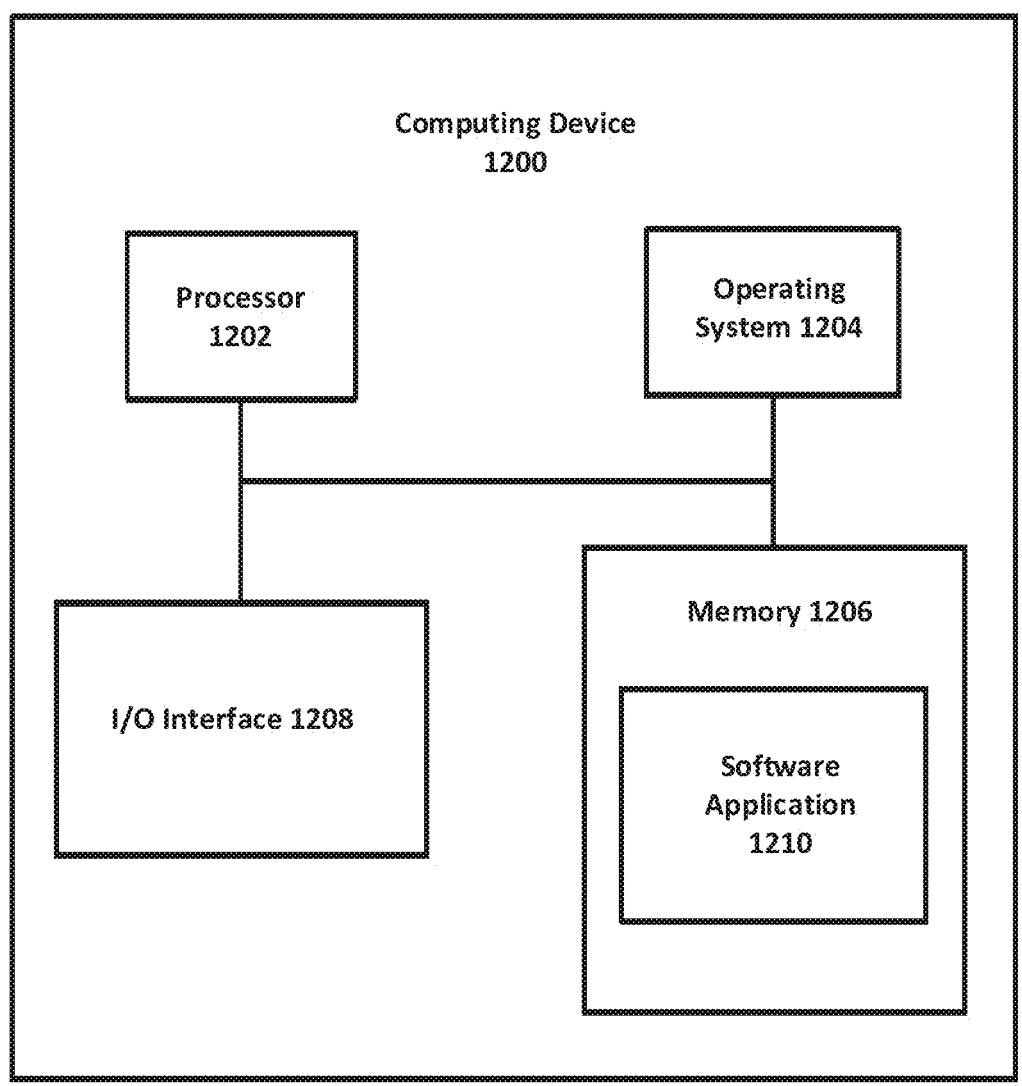
FIG. 12 is a general block diagram of a computing device usable to implement the embodiments described herein.

FIG. 12 is a general block diagram of a computing device 1200 usable to implement the embodiments described herein. While the computing device 1200 of FIG. 12 may be described as performing one or more of the steps in the embodiments herein, in other embodiments any suitable component or combination of components of the computing device 1200 or any suitable processor or processors associated with system 1200 may facilitate performing the steps.

FIG. 12 illustrates a block diagram of an example computing system 1200, which may be used for implementations described herein. For example, computing system 1200 may be used to implement user devices 1160-1190, and server devices 1110, 1120 of FIG. 11 as well as to perform the method implementations described herein. In some implementations, computing system 1200 may include a processor 1202, an operating system 1204, a memory 1206, and an input/output (I/O) interface 1208. In various implementations, processor 1202 may be used to implement various functions and features described herein, as well as to perform the method implementations described herein. While processor 1202 is described as performing implementations described herein, any suitable component or combination of components of system 1200 or any suitable processor or processors associated with system 1200 or any suitable system may perform the steps described. Implementations described herein may be carried out on a user device, on a server, or a combination of both.

Computing device 1200 also includes a software application 1210, which may be stored on memory 1206 or on any other suitable storage location or computer-readable medium. Software application 1210 provides instructions that enable processor 1202 to perform the functions described herein and other functions. The components of computing system 1200 may be implemented by one or more processors or any combination of hardware devices, as well as any combination of hardware, software, firmware, etc.

For ease of illustration, FIG. 12 shows one block for each of processor 1202, operating system 1204, memory 1206, I/O interface 1208, and software application 1210. These blocks 1202, 1204, 1206, 1208, and 1210 may represent multiple processors, operating systems, memories, I/O interfaces, and software applications. In various implementations, computing system 1200 may not have all of the components shown and/or may have other elements including other types of components instead of, or in addition to, those shown herein.

The hosts 111, 112, 121, 122 (FIG. 1) may be hardware computing systems, such as 1200 or they may be virtual machines executed on one or more hardware computing systems, such as 1200.

CONCLUSION

Although the description has been described with respect to particular embodiments thereof, these particular embodiments are merely illustrative, and not restrictive. For example, the features and operations could be arranged differently.

Although many examples provided herein are for analysis of weblogic server logs of java/javascript/html errors, which are the typical ones seen in a J2EE server logs, the various embodiments are not limited to J2EE systems. Servers that are built on other technologies, such as Perl, Python, Jython, CGI, Php, among others, typically generate errors/exceptions that typically include the same attributes i.e., error message and stack trace elements. Similarly, any system that can query an "issue/bug database" and identify potential known issues would work for any of the technologies and is not restricted to J2EE technologies. In essence, various embodiments are extendable to optimization of QA engineer log exception analysis activities on any kind of system built on any technology.

FIG. 2 depicts a RestErrorObjectArray 273 passed to the user interface 160. However, in another embodiment, the RestErrorObjectArray 273 may be passed to the bug correlation module 210, which invokes the GetAllKnownIssuesForErrors 211 for one or more of the errors in the RestErrorObjectArray 273. Then a list of known bugs 271 for each of those errors, as well as corresponding information from the RestErrorObjectArray 273, is passed from the bug correlation module 210 to the user interface 160.

Although many embodiments are illustrated in the context of exceptions and exception handlers, embodiments are well suited to errors that are not handled by exception handlers. For example, the errors may be for bugs in application instances that include logic that create error information similar to the exception information 600. More specifically in the case of null pointer type errors, the application instance logic could include instructions that if a pointer equals null, then create information that is the same or similar to exception information 600.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A tangible processor-readable storage device including instructions for a method of performing post error analysis for instances of applications in cloud service environments on a per user basis, wherein the tangible processor-readable storage device includes instructions executable by one or more processors for:

executing the instances of the applications in the cloud service environments that users interact with, wherein each of the cloud service environments includes a respective set of instances of the applications and wherein each of the cloud service environments and the respective set of instances is associated with a different one of the users;

detecting errors during the execution of the instances of the applications;

creating sets of log file information describing the errors, wherein each of the sets of log file information describes one of the errors;

creating log files that each include one of the sets of log file information and an identification of a cloud service environment where an associated error occurred;

categorizing the log files based on identifications of the cloud service environments; and providing a post error analysis report including information from the categorized log files for a particular cloud service environment whereby the post error analysis is performed on a per user basis.

2. The tangible processor-readable storage device as recited by claim 1, wherein the method further comprises:

augmenting each of the sets of log file information with additional information for the associated error, wherein the additional information includes an entry type, a date that the associated error occurred, hostname that the associated error occurred on, a name of an application the associated error occurred in, and the identification of the cloud service environment that the associated error occurred in.

3. The tangible processor-readable storage device as recited by claim 1, wherein the creating of the sets of log file information further comprises:

creating error related information for a particular error, wherein the error related information includes an exception message, a relevant exception line and a stack trace.

4. The tangible processor-readable storage device as recited by claim 1, wherein the categorizing of the log files further includes:

categorizing errors with at least similar error related information.

5. The tangible processor-readable storage device as recited by claim 4,
wherein the method further comprises:
counting number of errors with the at least similar error related information in the log files; and
providing in the post error analysis report, information about the categorizing of the errors with at least similar error related information and the number of errors with the at least similar error related information.

6. The tangible processor-readable storage device as recited by claim 1,
wherein the method further comprises:
determining if any of the errors have been previously debugged; and
indicating which of the errors have been previously debugged in the post error analysis report.

7. The tangible processor-readable storage device as recited by claim 1,
wherein the method further comprises:
executing the instances on hosts, wherein each of the instances is executed on a different one of the hosts.

8. The tangible processor-readable storage device as recited by claim 1,
wherein the method is performed without modifying the applications.

9. The tangible processor-readable storage device as recited by claim 1,
wherein the method further comprises:
associating log creation facilities with the instances, wherein each of the instances is associated with a different one of the log creation facilities.

10. The tangible processor-readable storage device as recited by claim 1, wherein the creating of the log files further comprises: augmenting, performed by log creation facilities, the sets of log file information with the identifications of the cloud service environments, wherein there is one identification with each of the cloud service environments; and
creating, performed by the log creation facilities, the log files that each include one of the sets of log file information and the identification of the cloud service environment where the associated error occurred.

11. A method of performing post error analysis for instances of applications in cloud service environments on a per user basis, the method comprising:
executing the instances of the applications in the cloud service environments that users interact with, wherein each of the cloud service environments includes a respective set of instances of the applications and wherein each of the cloud service environments and the respective set of instances is associated with a different one of the users;
detecting errors during the execution of the instances of the applications;
creating sets of log file information describing the errors, wherein each of the sets of log file information describes one of the errors;
creating log files that each include one of the sets of log file information and an identification of a cloud service environment where an associated error occurred;
categorizing the log files based on identifications of the cloud service environments; and
providing a post error analysis report including information from the categorized log files for a particular cloud service environment whereby the post error analysis is performed on a per user basis.

12. The method as recited by claim 11, wherein the method further comprises:
augmenting each of the sets of log file information with additional information for the associated error, wherein the additional information includes an entry type, a date that the associated error occurred, hostname that the associated error occurred on, a name of an application the associated error occurred in, and the identification of the cloud service environment that the associated error occurred in.

13. The method as recited by claim 11, wherein the creating of the sets of log file information further comprises:
creating error related information for a particular error, wherein the error related information includes an exception message, a relevant exception line and a stack trace.

14. The method as recited by claim 11, wherein the categorizing of the log files further includes:
categorizing errors with at least similar error related information.

15. The method as recited by claim 14, wherein the method further comprises:
counting number of errors with the at least similar error related information in the log files; and
providing in the post error analysis report, information about the categorizing of the errors with at least similar error related information and the number of errors with the at least similar error related information.

16. The method as recited by claim 11, wherein the method further comprises:
determining if any of the errors have been previously debugged; and
indicating which of the errors have been previously debugged in the post error analysis report.

17. The method as recited by claim 11, wherein the method further comprises:
executing the instances on hosts, wherein each of the instances is executed on a different one of the hosts.

18. The method as recited by claim 11, wherein the method is performed without modifying the applications.

19. The method as recited by claim 11, wherein the method further comprises:
associating log creation facilities with the instances, wherein each of the instances is associated with a different one of the log creation facilities.

20. An apparatus for performing post error analysis for instances of applications in cloud service environments on a per user basis comprising:
one or more processors; and
a tangible processor-readable storage device including instructions for:
executing the instances of the applications in the cloud service environments that users interact with, wherein each of the cloud service environments includes a respective set of instances of the applications and wherein each of the cloud service environments and the respective set of instances is associated with a different one of the users;
detecting errors during the execution of the instances of the applications;
creating sets of log file information describing the errors, wherein each of the sets of log file information describes one of the errors;

creating log files that each include one of the sets of log file information and an identification of a cloud service environment where an associated error occurred;
categorizing the log files based on identifications of the cloud service environments; and
providing a post error analysis report including information from the categorized log files for a particular cloud service environment whereby the post error analysis is performed on a per user basis.

* * * * *

UNITED STATES PATENT AND TRADEMARK OFFICE
CERTIFICATE OF CORRECTION

PATENT NO. : 10,379,934 B2  
APPLICATION NO. : 15/664956  
DATED : August 13, 2019  
INVENTOR(S) : Vedurumudi et al.

Page 1 of 1

It is certified that error appears in the above-identified patent and that said Letters Patent is hereby corrected as shown below:

In the Drawings

On sheet 6 of 11, in Figure 7, under Reference Numeral 702, Line 1, delete "occured" and insert -- occurred --, therefor.

In the Specification

In Column 3, Line 47, delete "stack);" and insert -- stack). --, therefor.

In Column 7, Line 14, delete "2)" and insert -- 2). --, therefor.

Signed and Sealed this  
Fourth Day of August, 2020

Andrei Iancu  
*Director of the United States Patent and Trademark Office*